US008596155B2

(12) United States Patent
Mullins, III et al.

(10) Patent No.: US 8,596,155 B2
(45) Date of Patent: Dec. 3, 2013

(54) APPARATUS FOR STARTING AN ENGINE

(75) Inventors: William M. Mullins, III, Salem, VA (US); Albert C. Jones, Roanoke, VA (US); Samuel S. Beckett, Eagle Rock, VA (US)

(73) Assignee: Cardinal Valley Industrial Supply, Inc., Salem, VA (US)

( * ) Notice: Subject to any disclaimer, the term of this patent is extended or adjusted under 35 U.S.C. 154(b) by 233 days.

(21) Appl. No.: 13/075,492

(22) Filed: Mar. 30, 2011

(65) Prior Publication Data

US 2011/0308341 A1 Dec. 22, 2011

Related U.S. Application Data

(60) Provisional application No. 61/356,377, filed on Jun. 18, 2010.

(51) Int. Cl.
*F16H 3/06* (2006.01)

(52) U.S. Cl.
USPC ......... 74/89.38; 74/6; 74/7 A; 74/7 C; 74/7 R

(58) Field of Classification Search
USPC ....... 74/89.38, 6, 7 A, 7 C, 7 R, 89.23, 38, 39
See application file for complete search history.

(56) References Cited

U.S. PATENT DOCUMENTS

| | | | | | |
|---|---|---|---|---|---|
| 1,556,351 | A | * | 10/1925 | Richards | 74/7 R |
| 1,705,938 | A | * | 3/1929 | McGrath | 74/6 |
| 1,870,075 | A | * | 8/1932 | Sutter | 74/6 |
| 2,035,161 | A | * | 3/1936 | Herzmark | 92/2 |
| 2,197,155 | A | * | 4/1940 | Nardone | 74/424.9 |
| 2,205,333 | A | * | 6/1940 | Baer | 74/7 R |
| 2,298,717 | A | * | 10/1942 | Nardone | 74/7 R |
| 2,347,788 | A | * | 5/1944 | Nardone | 475/337 |
| 2,407,048 | A | * | 9/1946 | Whitney et al. | 74/7 R |
| 2,447,198 | A | * | 8/1948 | Miller | 290/38 R |
| 2,450,129 | A | * | 9/1948 | Gleasman | 74/7 R |
| 2,987,059 | A | * | 6/1961 | Mendenhall et al. | 123/185.4 |
| 3,140,617 | A | * | 7/1964 | Palmer | 74/6 |
| 3,213,841 | A | * | 10/1965 | Woltanski et al. | 123/185.8 |
| 3,394,598 | A | * | 7/1968 | Hoch | 74/6 |
| 3,536,051 | A | * | 10/1970 | Hamman | 123/179.26 |
| 3,646,820 | A | * | 3/1972 | Vogel et al. | 74/6 |
| 5,040,497 | A | * | 8/1991 | Dingle | 123/179.21 |
| 5,163,335 | A | * | 11/1992 | Isom et al. | 74/6 |
| RE35,425 | E | * | 1/1997 | Isom et al. | 74/6 |
| 5,673,593 | A | * | 10/1997 | Lafferty | 74/89.38 |
| 6,752,032 | B2 | * | 6/2004 | Yamauchi | 74/7 C |
| 6,937,122 | B2 | * | 8/2005 | Ho et al. | 335/126 |
| 7,073,471 | B1 | * | 7/2006 | Mead | 123/151 |
| 2007/0295118 | A1 | * | 12/2007 | Chu | 74/6 |

* cited by examiner

*Primary Examiner* — David M Fenstermacher
*Assistant Examiner* — Zakaria Elahmadi
(74) *Attorney, Agent, or Firm* — Venable LLP; Steven J. Schwarz

(57) ABSTRACT

A drive for coupling an engine starter to an engine includes a drive portion including a screw shaft, and a clutch portion including a clutch body, wherein the clutch body is integrated with the screw shaft.

15 Claims, 24 Drawing Sheets

APPARATUS FOR STARTING AN ENGINE

CROSS-REFERENCE TO RELATED APPLICATIONS

The present application claims priority under 35 U.S.C. §119 to U.S. Provisional Application No. 61/356,377, filed on Jun. 18, 2010, the entire content of which is expressly incorporated herein by reference.

TECHNICAL FIELD

The subject matter of the present application relates generally to a drive apparatus for starting an engine, and more specifically, to a bendix drive apparatus.

BACKGROUND

A bendix drive is a slip clutch attached to a shaft and gear and is typically used to transfer the power generated by an engine starter to the engine, e.g., through a ring gear on the engine, to spin the engine for starting. Often the bendix drives are referred to as "Facet" drives, since they were originally made by Facet Enterprises, Inc. The original part numbers for the bendix drives may be called the "Facet" number.

The bendix design assembly is reliable and affordable. Facet manufactured a fairly extensive line of bendix drives. For example, part numbers A3111 and A3236 are commonly used bendix drive assemblies. Part numbers A3111 and A3236 are right and left hand versions of the same drive, i.e., substantially the same slip clutch with a right and left hand screw shaft and pinion. The A3111 and A3236 are designed to transfer approximately 275-295 ft/lbs of torque from the starter to the ring gear during the starting cycle. The Facet A3111/A3236 was designed for the engine starters manufactured in the 1940s and 1950s that had peak torque output of approximately +/−250 ft/lbs.

The bendix design continues to be used in many starting applications at present. Although some manufacturers copied the A3111/A3236 since the mid 1900s, such designs have failed to improve the drive's design or increase the drive's torque transfer capabilities to accommodate the higher torques produced by present day starters.

SUMMARY

According to an embodiment, a drive for coupling an engine starter to an engine comprises a drive portion including a screw shaft, and a clutch portion including a clutch body, wherein the clutch body is integrated with the screw shaft.

BRIEF DESCRIPTION OF THE DRAWINGS

The subject matter of the application will be more readily understood from the following detailed description when read in conjunction with the accompanying drawings, in which.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

The present application relates to drives used in starting engines, such as bendix-type drives, that have the capability to transfer more torque at starting than prior art drives, for example, approximately 395-415 ft/lbs of torque. The drives also have the same or similar envelope size as the prior art drives, such as the A3111/A3236 drives, so that drives with increased torque capacity can fit into existing starter models without having to modify existing drive housings.

Figure 1:
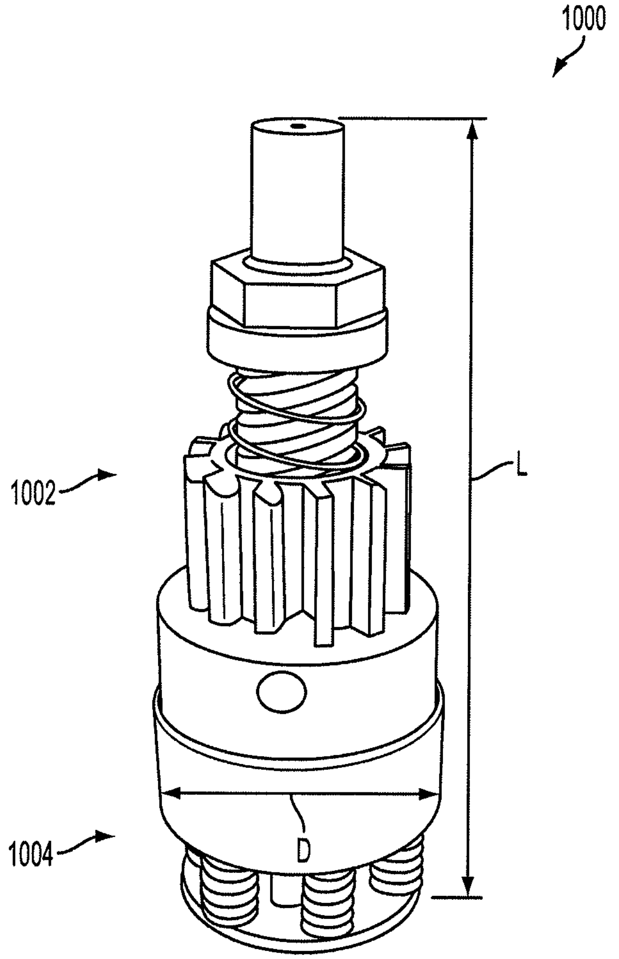
FIG. 1 PRIOR ART
FIG. 1 is a perspective view of a screw shaft and clutch body assembly of a drive apparatus according to the prior art.
Figure 2:
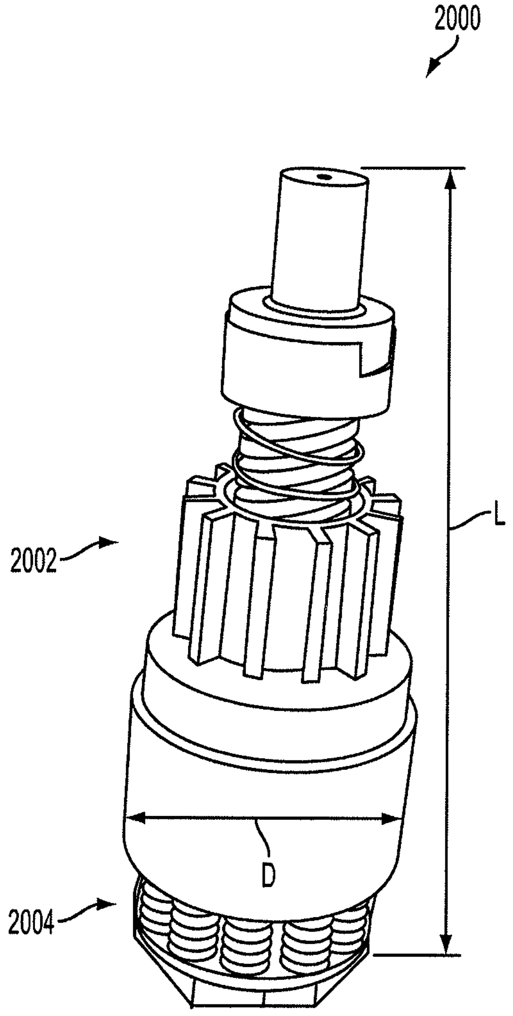
FIG. 2 is a perspective view of an embodiment of a screw shaft integrated with a clutch body apparatus.

FIG. 1 shows a prior art drive and clutch assembly 1000 of the bendix A3111/A3236 drive. FIG. 2 shows a drive and clutch assembly 2000 according to an embodiment of the present invention. Although the assembly 1000 of FIG. 1 is different from the assembly 2000 of FIG. 2, the length L, diameter D, and/or weight can be the same or substantially the same. The length L and the diameter D may be important elements of the apparatus, for example, to facilitate retro-fitting. Some of the differences between the apparatus 2000 and the prior art assembly 1000 may assist to expedite assembly.

Figure 3:
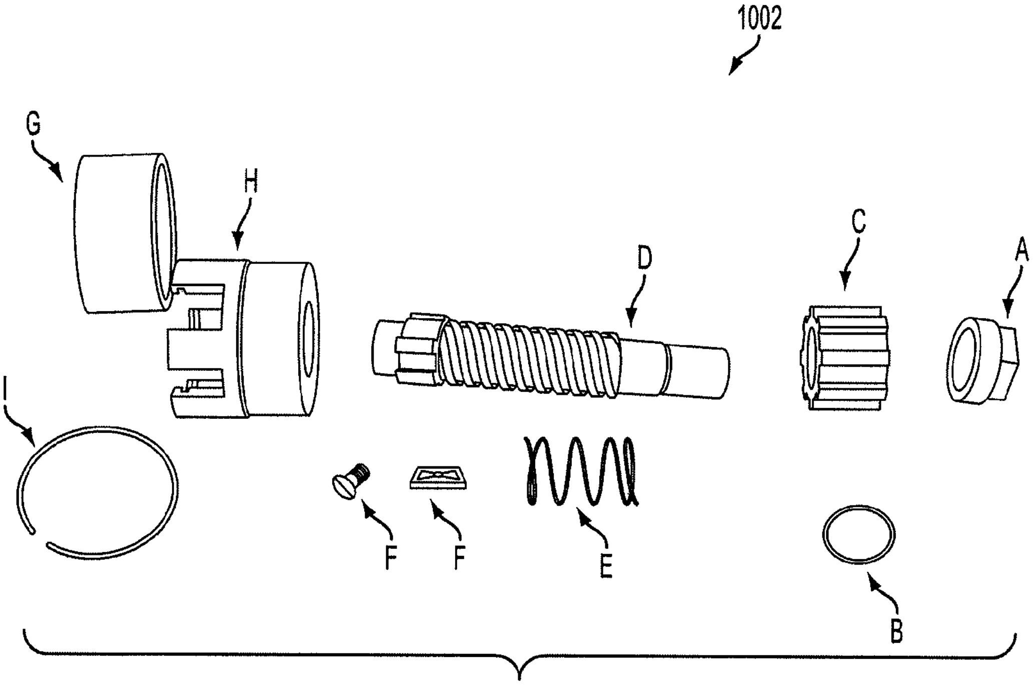
FIG. 3 PRIOR ART
FIG. 3 is an exploded view of the prior art screw shaft and clutch body assembly shown in FIG. 1.

FIG. 3 shows an exploded view of the drive portion 1002 of the prior art assembly 1000 of FIG. 1. The drive portion 1002 can include a stop nut A, a stop nut ring B, a pinion C, a screw shaft D, a drift spring E, a pinion back stop and screw F, a clutch cover G, a clutch body H, and a disc retaining ring I. The screw shaft D and the clutch body H are two separate parts joined together using the pinion back stop and screw F.

Figure 4:
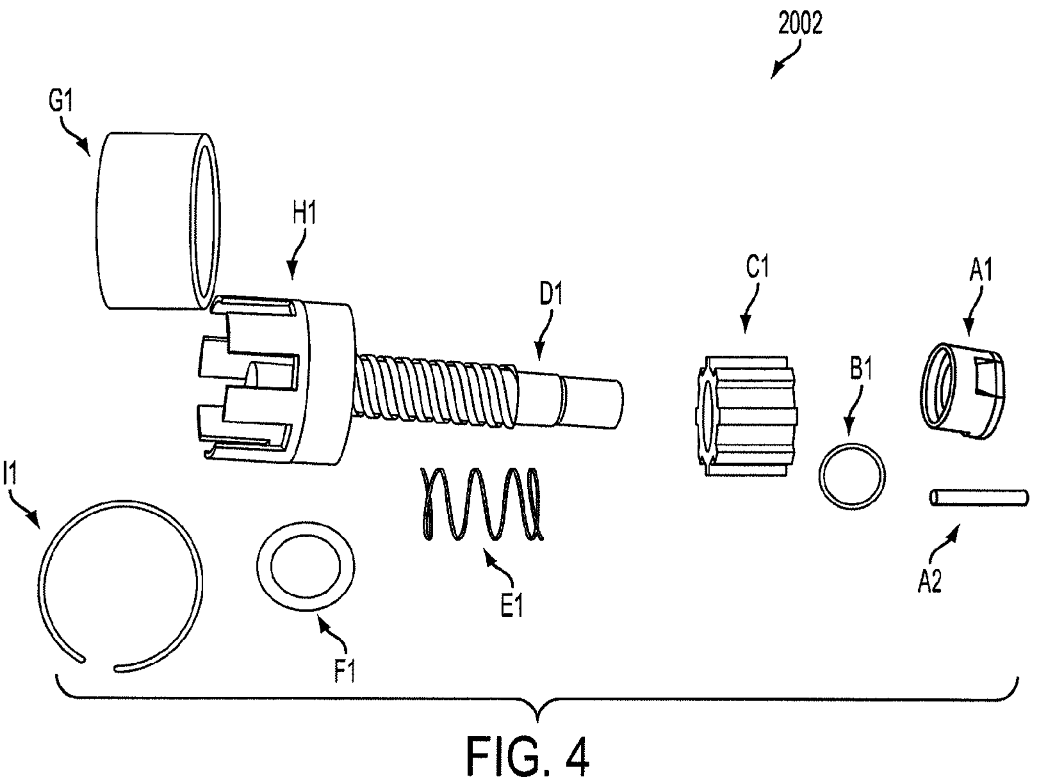
FIG. 4 is an exploded view of the screw shaft with integrated clutch body apparatus of FIG. 2.

FIG. 4 shows an exploded view of the drive portion 2002 of the apparatus 2000 of FIG. 2 according to an embodiment of the invention. The apparatus can include a stop nut A1, a stop nut shear pin A2, a stop nut ring B1, a pinion C1, a screw shaft D1 including an integral clutch body H1, a drift spring E1, a pinion washer F1, a clutch cover G1, and a disc retaining ring I1.

Unlike the drive of the prior art assembly, the drive portion 2002 can utilize a one-piece, integrated screw shaft D1 and clutch body H1. As a result, the pinion back stop and screw F of the prior may be omitted. The one-piece, integrated screw shaft D1 and clutch body H1 of FIG. 4 yields a stronger, more robust screw shaft/clutch body combination than the two-piece screw shaft and clutch body assembly of the prior art. According to an embodiment, the screw shaft D1 with integrated clutch body H1 can be machined from a single piece of raw material. Alternatively, the screw shaft D1 and integrated clutch body H1 can be two separate parts that are permanently joined together, for example, by welding or bonding.

The screw shaft D1 and clutch body H1 can eliminate the clearances required to assemble the two pieces. In the prior art design, the pinion back stop and screw F serve as the key for joining the screw shaft D and clutch body H. These parts are not needed in the one-piece configuration of FIG. 4. The lugs at the base of the prior art screw shaft D can also be eliminated in the embodiment of FIG. 4, since the lugs are the weakest link in the assembly.

Figure 7:
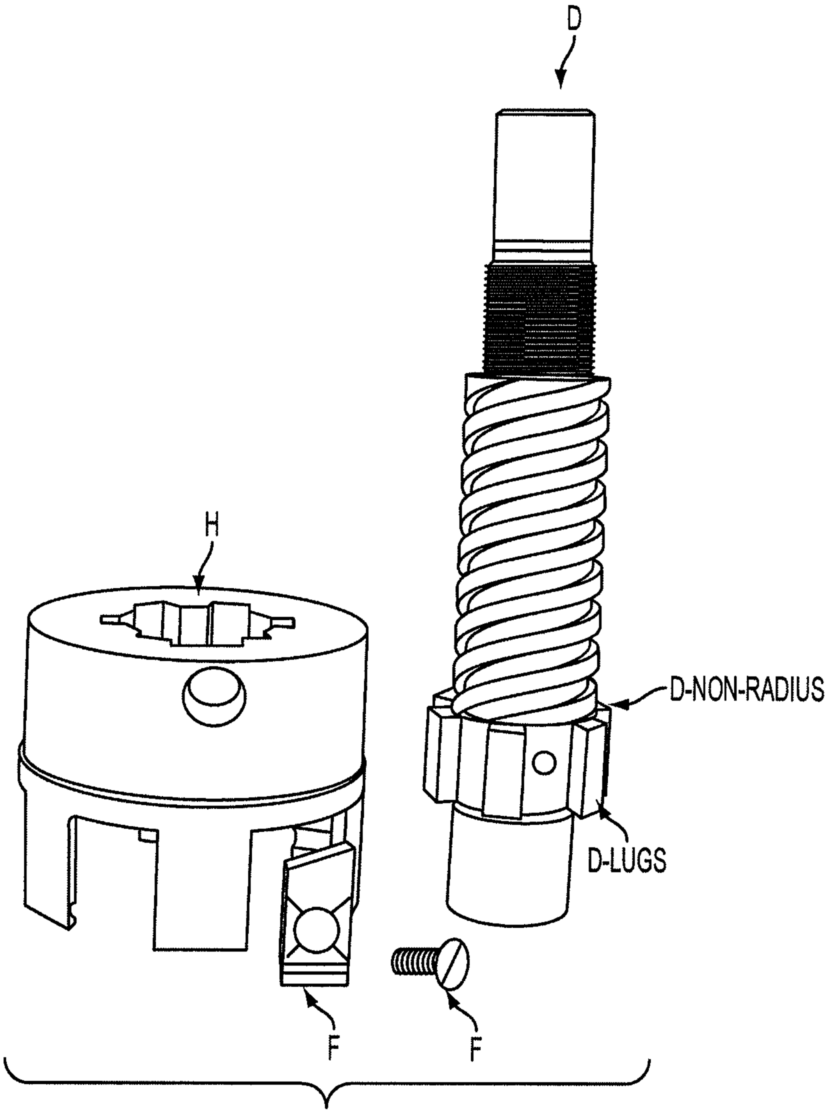
FIG. 7 PRIOR ART
FIG. 7 is a perspective view of the prior art screw shaft and clutch body assembly of FIG. 1, showing a screw and pinion backstop attachment.
Figure 8:
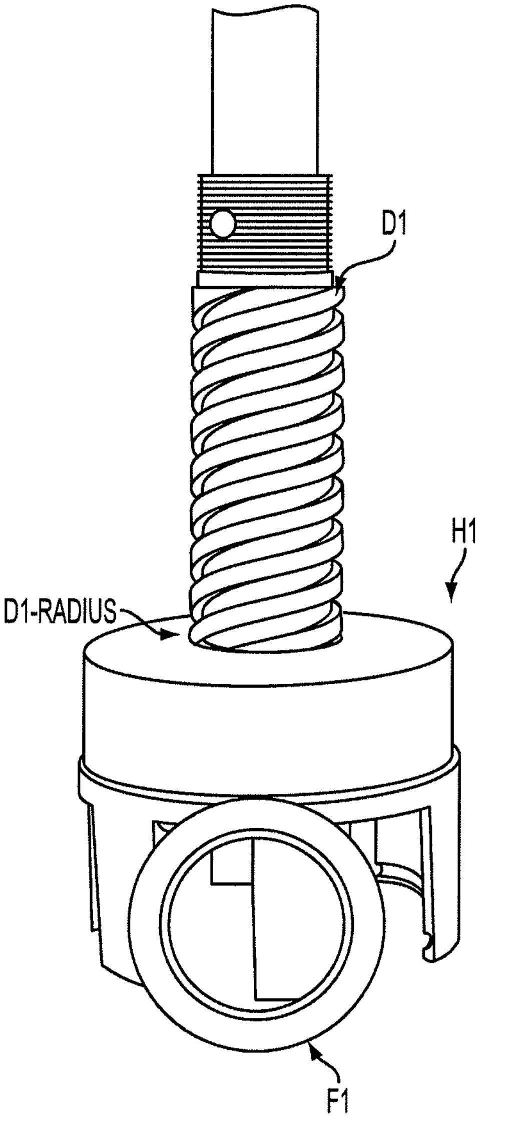
FIG. 8 is a perspective view of an embodiment of the screw shaft with integrated clutch body apparatus of FIG. 2, showing an embodiment of a pinion stop washer.

The single piece screw shaft D1 and clutch body H1 can include a fillet or radius (see D1-Radius in FIG. 8) where the screw shaft D1 joins the clutch body H1, thereby providing additional strength at the junction. The radius may be approximately 0.01 to 0.1 inches, such as 0.04 to 0.08 inches, however, other dimensions may be possible. According to an embodiment, the radius is about 0.063 inches with a tolerance of about +/−0.005 inches. In contrast, the prior art assembly fails to have a radius (See D-Non-Radius in FIG. 7).

While maintaining approximately the same envelope size, the drive 2002 of FIG. 4 may transmit 35-40% more torque from the starter to the engine ring gear than the drive 1002 of FIG. 3. To further this increase in torque capacity, additional components of the drive 1002 can be modified to have increased size/thickness, decreased size/thickness, and/or increased in quantity.

Figure 5:
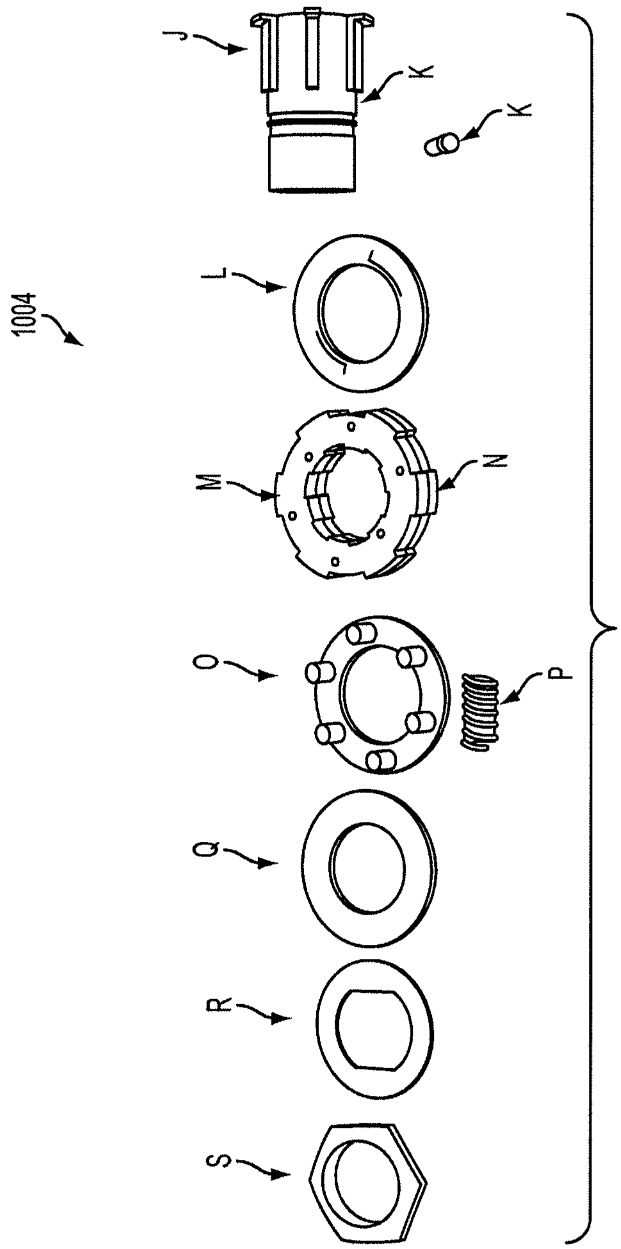
FIG. 5 PRIOR ART
FIG. 5 is an exploded view of the clutch portion of the prior art screw shaft and clutch body assembly of FIG. 1.

FIG. 5 shows an exploded view of the clutch portion 1004 of the prior art assembly of FIG. 1. The clutch 1004 includes a head J, a head screw and lock ring K, a backing washer L, a metal head disc M, a copper body disc N, a plate and pin assembly O, pressure springs P, an adjusting plate Q, a lock washer R, and an adjusting nut S.

Figure 6:
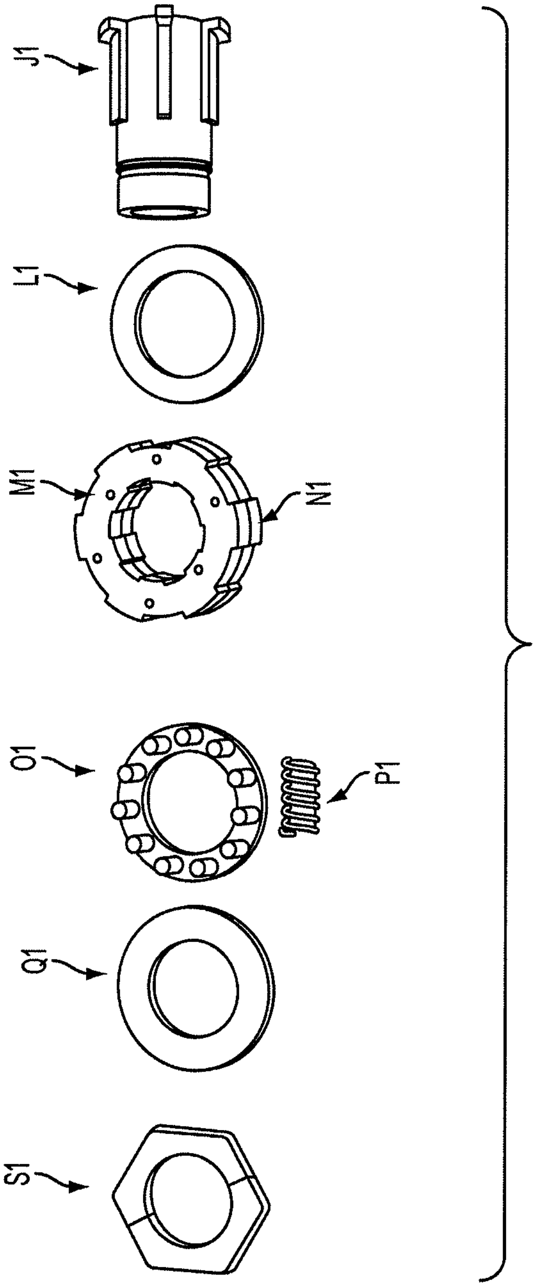
FIG. 6 is an exploded view of an embodiment of the clutch portion of the apparatus of FIG. 2.

FIG. 6 shows an exploded view of an embodiment of the clutch portion 2004 of the apparatus of FIG. 2. The clutch can include a head J1, a backing washer L1, a head disc M1, a body disc N1, a plate and pin assembly O1, pressure springs P1, an adjusting plate Q1, and an adjusting nut S1. In comparison to the prior art assembly of FIG. 1, the head screw and lock ring K and/or lock washer R may be omitted.

Figure 9:
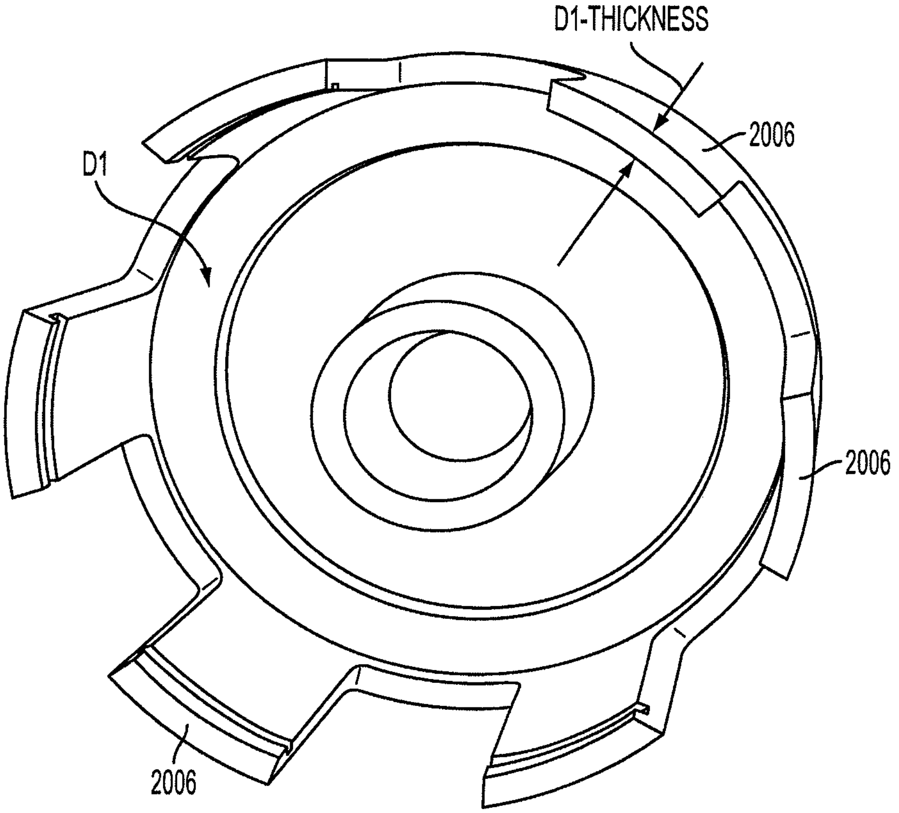
FIG. 9 shows the underside of the screw shaft with integrated clutch body apparatus of FIG. 8.
Figure 10:
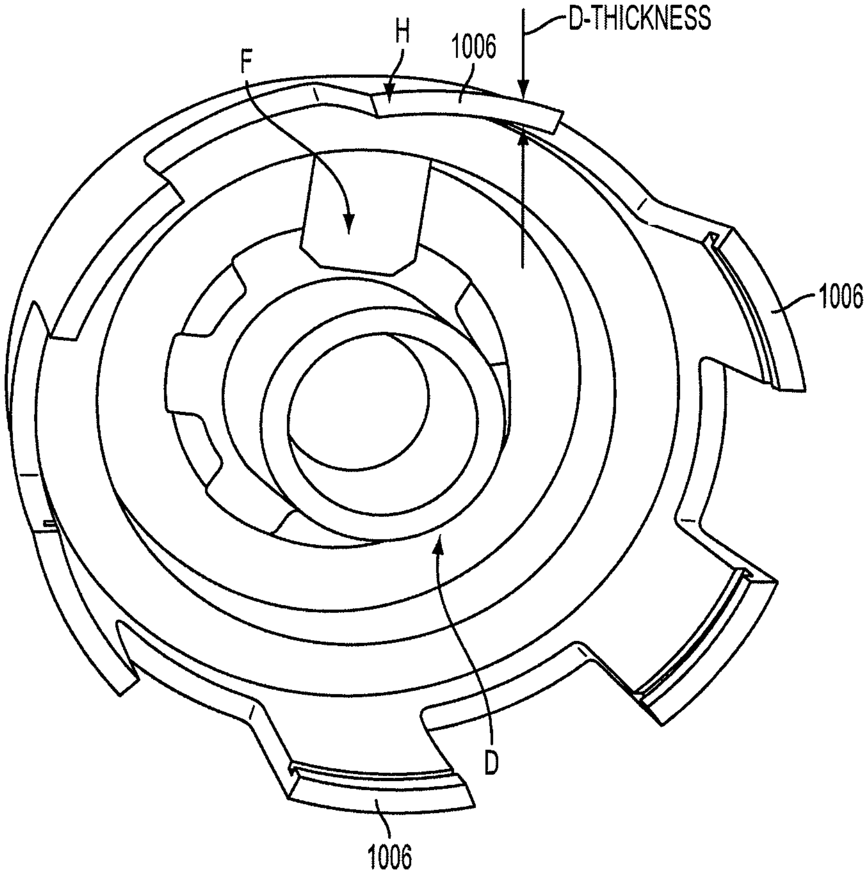
FIG. 10 PRIOR ART
FIG. 10 shows the underside of the prior art screw shaft and clutch body assembly of FIG. 7 with the pinion back stop.

FIG. 9 shows the underside of the screw shaft D1 and clutch body H1. FIG. 10 shows the underside of the prior art drive assembly comprising the screw shaft D, clutch body H, and pinion back stop F connecting them together.

Figure 11:
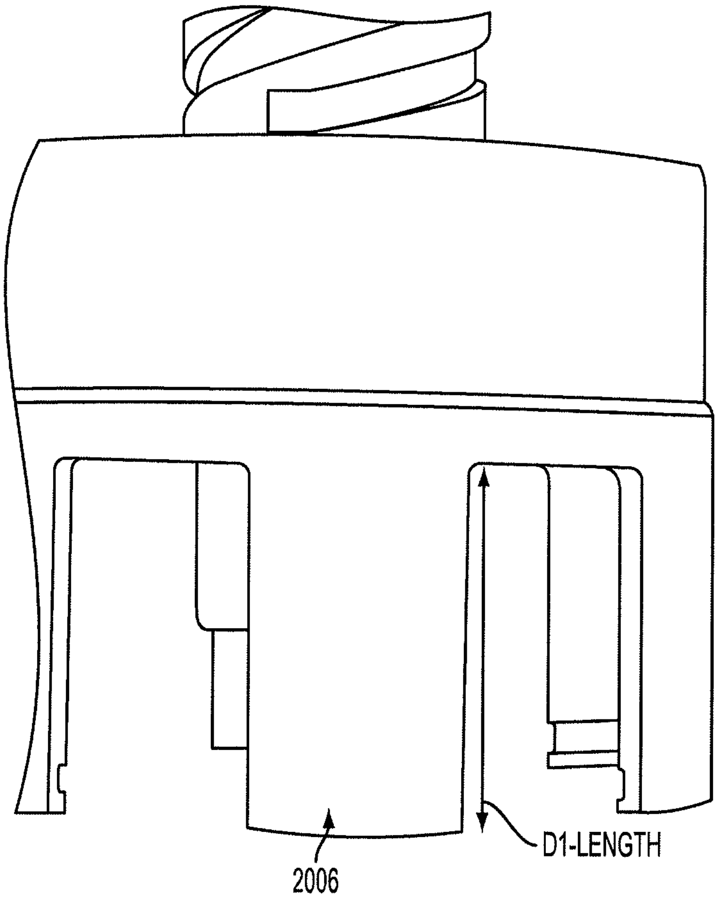
FIG. 11 is a side view of the screw shaft with integrated clutch body apparatus of FIG. 9.
Figure 12:
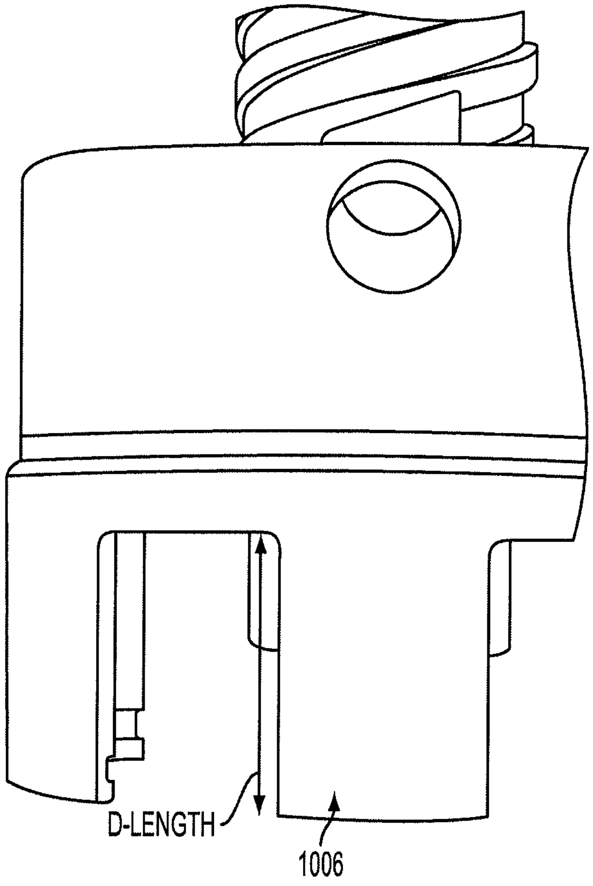
FIG. 12 PRIOR ART
FIG. 12 is a side view of the prior art screw shaft and clutch body assembly of FIG. 10.

FIG. 11 shows a side view of the screw shaft D1 and integrated clutch body H1 of FIG. 9. The clutch body H1 can have fingers 2006 that are longer in comparison to the fingers 1006 of the prior art drive assembly shown in the side view of FIG. 12. For example, the fingers 2006 can define a length “D1-Length” that is at least about 1 inch long, for example, about 1.2 to 1.4 inches. According to an embodiment, the length can be approximately 1.310 inches with a tolerance of about +/−0.005 inches. In contrast, the fingers 1006 of the prior art have a length “D-length” that is 0.979 inches. According to an embodiment, the increase in length can represent approximately 0.331 inches or 33.8% of an increase.

The fingers 2006 of FIG. 11 can also be thicker than the prior art fingers 1006, for example, to increase the shear strength of the fingers. Referring to FIG. 9, an embodiment of the fingers 2006 can have a thickness “D1-Thickness” of about 0.150 to 0.30 inches. According to an embodiment, the thickness “D1-Thickness” may be about 0.269 inches with a tolerance of about +/−0.002 inches. In contrast, the prior art fingers 1006 have a thickness “D-Thickness” shown in FIG. 10 of 0.117 inches. According to an embodiment, this increase in thickness represents approximately 0.152 inches, or 129.9% of an increase.

Typically, the fingers bear the radial pressure created by the body disc N, N1 during a start attempt. The increased finger thickness in screw shaft D1 can improve the radial strength of the apparatus, and according to an embodiment, may increase the capacity of the drive by about 35-40%.

The increased length D1-Length of the fingers 2006 shown, for example, in FIG. 11, can make it possible to accommodate more sets of the body and head discs M1, N1 (See FIG. 6). The sets of head and body discs M1, N1 may include a slip clutch feature. According to an embodiment, the body disc N1 meshes with the clutch body fingers 2006 and the head disc M1 meshes with the splined portion of the head J1. The head disc M1 moves independently of the body disc N1, creating the “slip.” In comparison with the prior art assembly of FIG. 1, the clutch 2004 of FIG. 2 can accommodate more discs M1, N1 in order to, for example, transfer the load and/or dissipate heat caused by the transmission of 35-40% more power. The prior art clutch 1004 used 13 head discs M and 12 body discs N, whereas the apparatus according to an embodiment of the present invention may utilize at least 15 head discs M1 and at least 14 body discs N1.

According to an embodiment, the apparatus includes body discs N1 having increased thickness and improved design. For example, the body disc N1 thickness may be approximately 0.035 to 0.045 inches. According to an embodiment, the thickness is about 0.040 inches with a tolerance of about +/−0.001 inches. This may result in a reduction in disc warp from heat and pressure while simultaneously adding sheer strength to the ears of the body disc N1.

Figure 13:
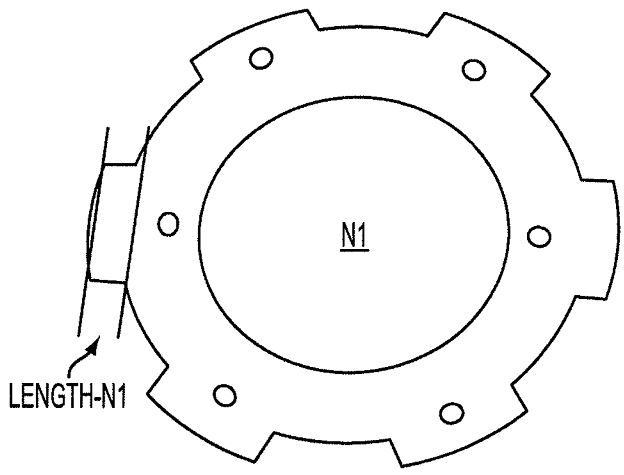
FIG. 13 is a top view of an embodiment of a drive body disc of the apparatus of FIG. 2.
Figure 14:
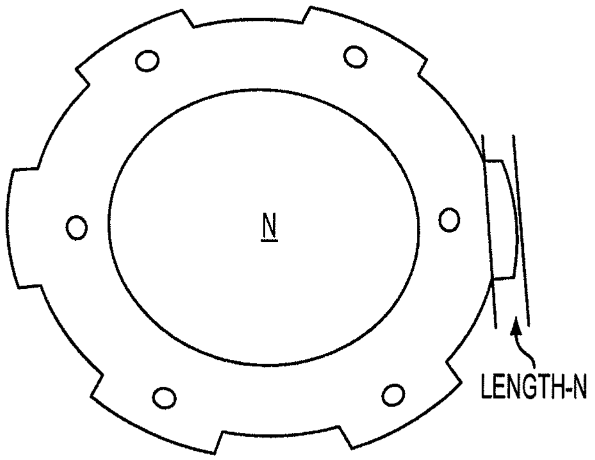
FIG. 14 PRIOR ART
FIG. 14 is a top view of the drive body disc of the prior art screw shaft and clutch body assembly of FIG. 1.

In the embodiment shown in FIG. 13, the ears of the body disc N1 may be lengthened to increase the contact area with the fingers 2006 of the clutch body H1 to further increase the shear strength. For example, as shown in FIG. 14, the ears of the prior art body discs N typically have a length “Length-N” of 0.109 inches. However, according to the embodiment of FIG. 13, the ears may have a length “Length-N1” of approximately 0.120 to 0.170 inches. According to an embodiment, the ears may have a length of about 0.152 inches with a tolerance of about +/−0.003 inches.

Figure 15:
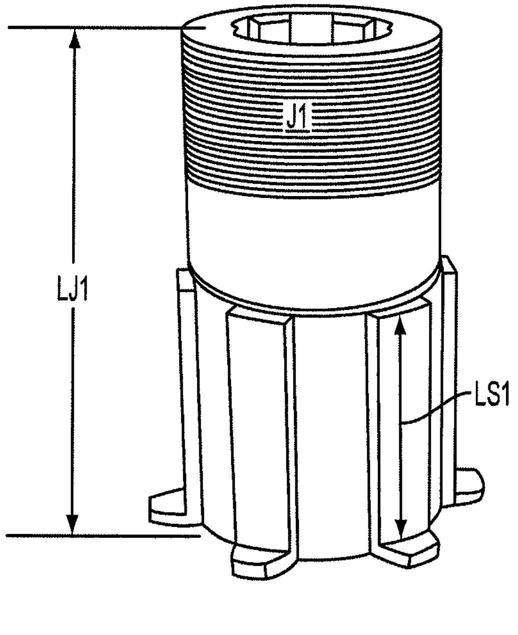
FIG. 15 is a perspective view of an embodiment of a head of the clutch apparatus of FIG. 6.
Figure 16:
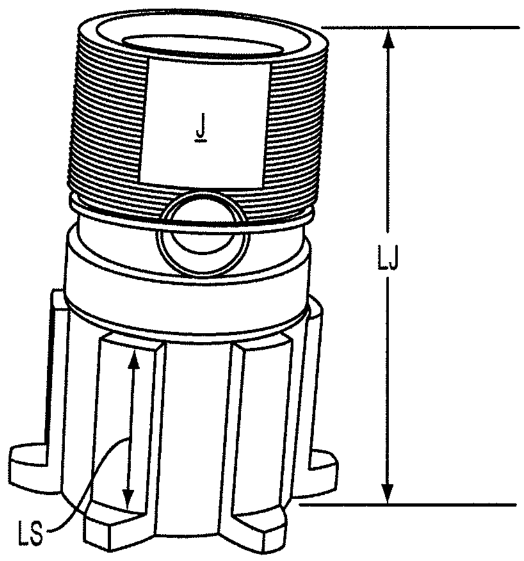
FIG. 16 is a perspective view of the head of the prior art clutch assembly of FIG. 5.

FIG. 16 depicts the assembly head J of a prior art A3111/A3236 drive and clutch assembly. The assembly head J has a total length LJ of 2.946 inches with the spline defining a length LS of 1.081 inches. In the embodiment of FIG. 15, the assembly head J1 can have a length LJ1 of approximately 3.054 inches (with a tolerance of about +/−0.005 inches), and can have a spline length LS1 greater than 1.2 inches, for example, approximately 1.454 inches with a tolerance of about +/−0.005 inches. Although the head J1 may be longer than the prior art head J, the apparatus is still able to be used within the same envelope as the prior art assembly.

Figure 18:
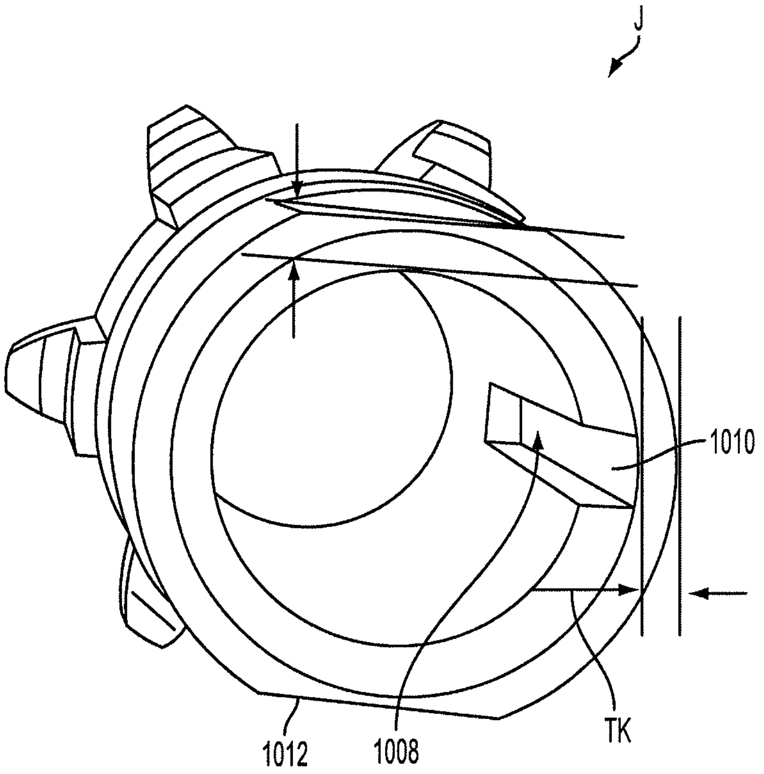
FIG. 18 PRIOR ART
FIG. 18 is a bottom view of the prior art clutch head of FIG. 16 with a key/set screw system.

FIG. 18 depicts a top view of the prior art assembly head J. The internal wall of the assembly head includes a key/set screw system 1008 for the head J to link with the starter drive shaft. The key/set screw system 1008 includes a key slot 1010 and flats 1012 as depicted in FIG. 18. The key slot thickness TK is 0.142 inches at the thinnest point, and the thickness at the flat 1012 is about 0.156 inches. The flats secure a lock washer R.

Figure 17:
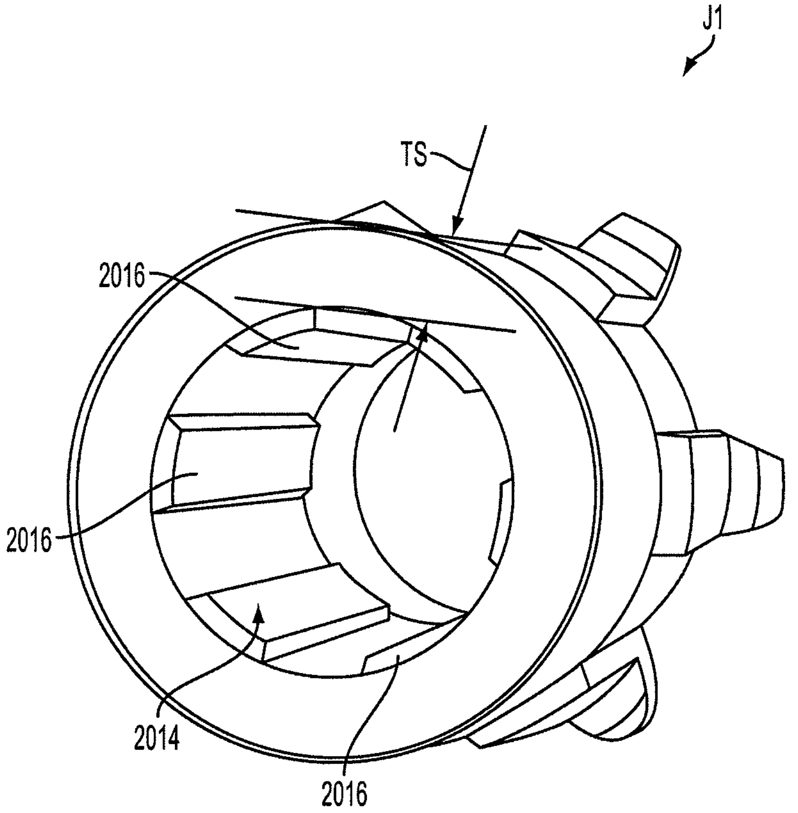
FIG. 17 is a bottom perspective view of the clutch head of FIG. 15 showing an embodiment of a spline system.

FIG. 17 depicts a bottom perspective view of an embodiment of the head J1. The head J1 can utilize a spline system 2014 to couple the head J1 with the starter drive shaft. For example, inner rib splines 2016 can run longitudinally along the inside wall. According to an embodiment, the wall thickness TS at the slots between splines 2016 can be approximately 0.2 to 0.3 inches, for example 0.225 to 0.275 inches, and more specifically, about 0.250 inches with a tolerance of about +/−0.005 inches. The spline system 2014 allows the drive to more evenly transmit higher torque loads.

According to an embodiment, each rib spline 2016 can define a length between about 1.70 and 2.00 inches, for example, approximately 1.942 inches. Each spline 2016 can also define a depth of at least approximately 0.050 inches. In comparison with the prior art assembly head of FIG. 18, the spline system 2014 can increase the load capabilities of the drive by eliminating thin points in the head’s wall caused by the key slot 1008 and/or the flats 1012.

Figure 19:
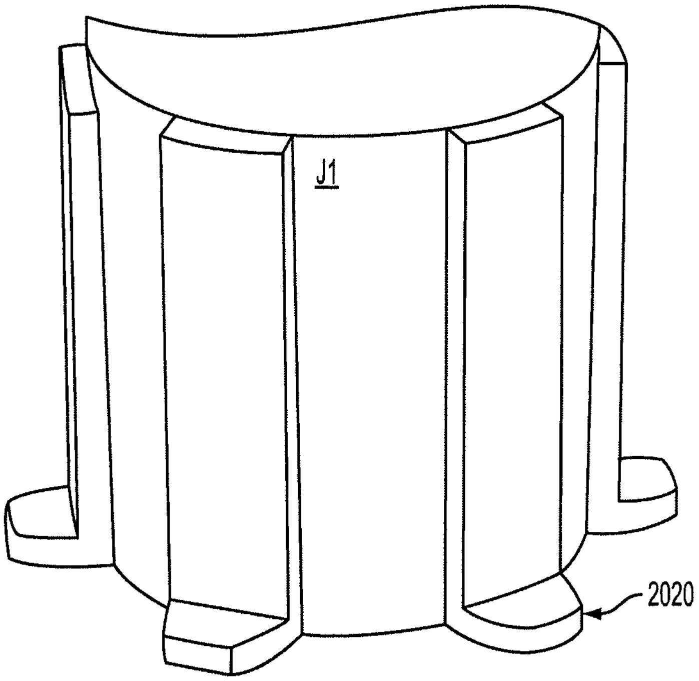
FIG. 19 is a perspective view of the head of the clutch apparatus of FIG. 6.
Figure 20:
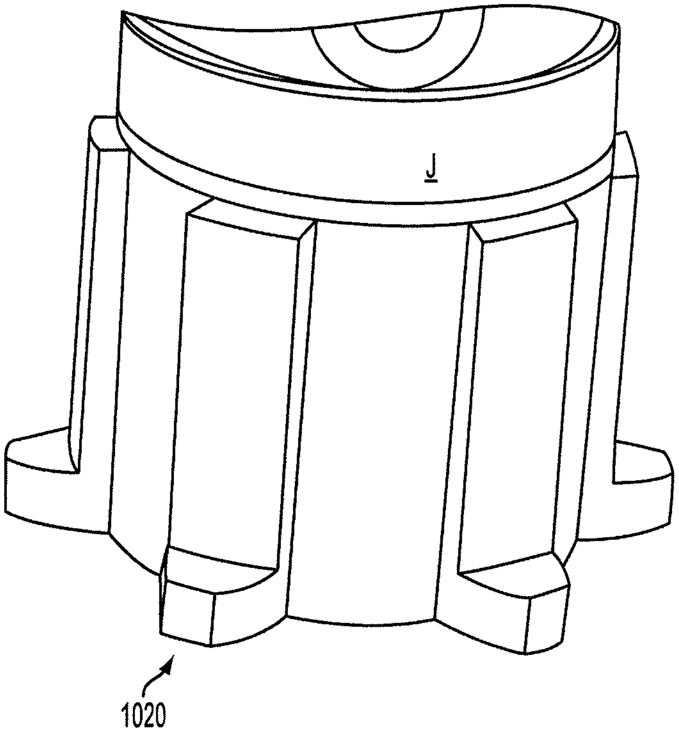
FIG. 20 PRIOR ART
FIG. 20 is a perspective view of the head of the prior art clutch assembly of FIG. 5.

The backing washer L used in the prior art has a thickness of 0.295. The ears 1020 used on the prior art head J are 0.200 inches thick, as depicted in FIG. 20. Due to the lengthening of the head J1, the backing washer L1 can have a thickness of approximately 0.140 to 0.160 inches, for example, approximately 0.150 inches. The ears 2020 of the head J1 may be approximately 0.090 to 0.110 inches thick. According to an embodiment, the ears 2020 are about 0.102 inches thick with a tolerance of about +/−0.005 inches as depicted in FIG. 19. The backing washer L1 and fingers 2006 according to the invention can support a static pressure that is not affected by increased torque loads, thus allowing for a reduction in the thickness of the ears 2020 and backing washer L1.

Figure 21:
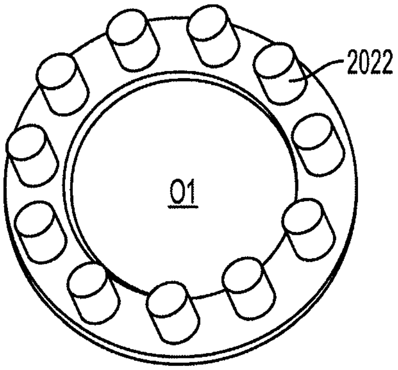
FIG. 21 is a top perspective view of an embodiment of a plate pin assembly for the screw shaft integrated with the clutch body apparatus of FIG. 2.
Figure 22:
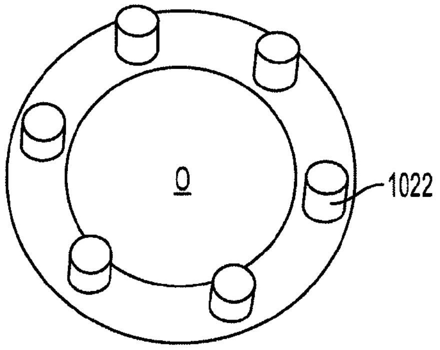
FIG. 22 PRIOR ART
FIG. 22 is a top perspective view of the plate pin assembly for the prior art screw shaft and clutch body assembly of FIG. 1.

FIG. 22 is a top perspective view of the prior art plate pin assembly O for the screw shaft and clutch body assembly of FIG. 1. The plate O has 6 pressure springs 1022. FIG. 21 is a top perspective view of an embodiment of a plate pin assembly O1 of the present invention. The plate pin assembly O1 can include more pressure springs than the plate pin assembly O. For example, the plate pin assembly O1 may include 11 pressure springs 2022. The extra springs 2022 allow more pressure to be applied to the stack of head discs M1 and body N1 discs which along with the extra sets of head and body discs M1, N1, can create additional friction to allow the drive of the present invention to more evenly transmit higher torques.

Figure 24:
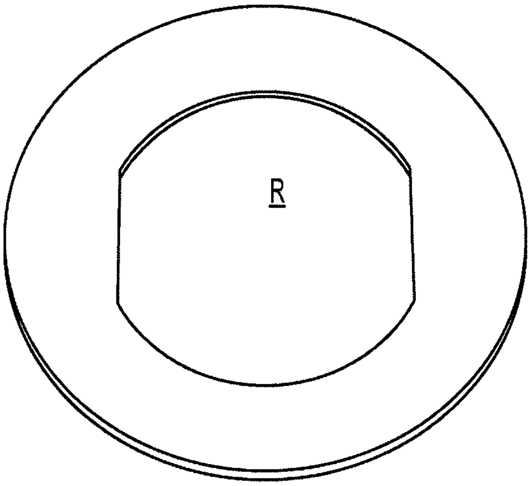
FIG. 24 PRIOR ART
FIG. 24 is a perspective view of the lock washer for the prior art screw shaft and clutch body assembly of FIG. 1.
Figure 25:
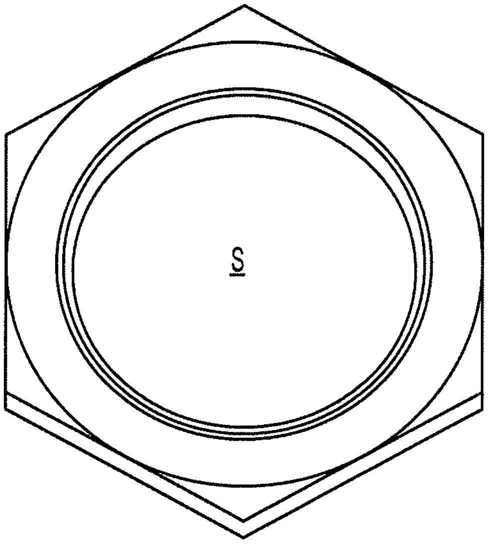
FIG. 25 PRIOR ART
FIG. 25 is a perspective view of the adjusting nut system for the prior art screw shaft and clutch body assembly of FIG. 1.
Figure 26:
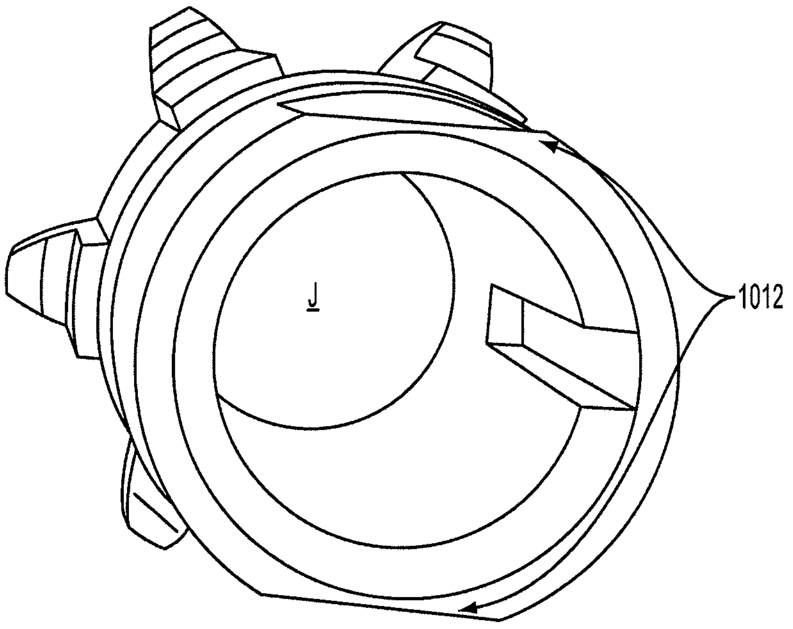
FIG. 26 PRIOR ART
FIG. 26 is a top perspective view of the prior art head of FIG. 20 depicting where the prior art lock washer of FIG. 24 links together with the head.

FIGS. 24 and 25 depict a perspective view of the lock washer R and adjusting nut system S of the prior art. The assembly adjusting nut S may be locked in place by bending the edges of the lock washer R over two of the flat sides of the adjusting nut S. The lock washer R couples with the flats 1012 on the head J, thereby holding the lock washer R in place. As a result, it can lock the adjusting nut S when the desired torque range setting is achieved. FIG. 26 is a bottom perspective view of the prior art head J depicting the flats 1012 where the lock washer R couples together with the head J.

Figure 23:
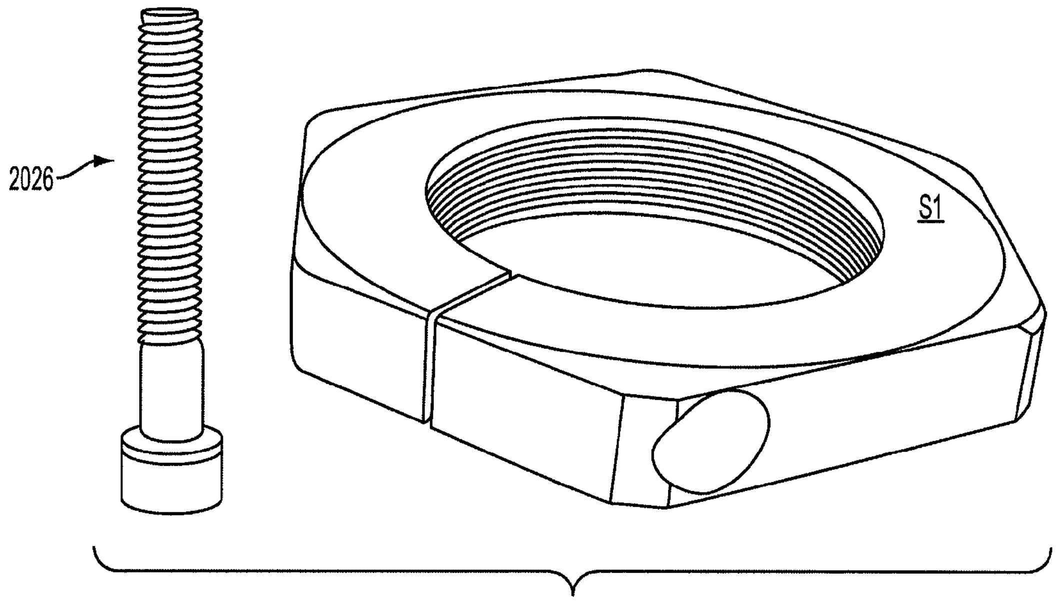
FIG. 23 is a perspective view of an embodiment of an adjusting nut and lock screw for the screw shaft integrated with the clutch body apparatus of FIG. 2.

FIG. 23 is a perspective view of an embodiment of the adjusting nut S1 for the screw shaft and clutch body J1. An embodiment of a lock screw 2026 is also shown. The adjusting nut S1 may replace the lock washer R and adjusting nut S configuration of the prior art. The adjusting nut S1 can comprise a split nut with the lock screw 2026. The adjusting nut S1 can be thicker than the prior art adjusting nut S, thereby allowing room for more threads, resulting in better hold. The lock screw 2026 allows the adjusting nut S1 to be locked at the position where the desired torque range setting for the clutch pack is achieved.

Figure 28:
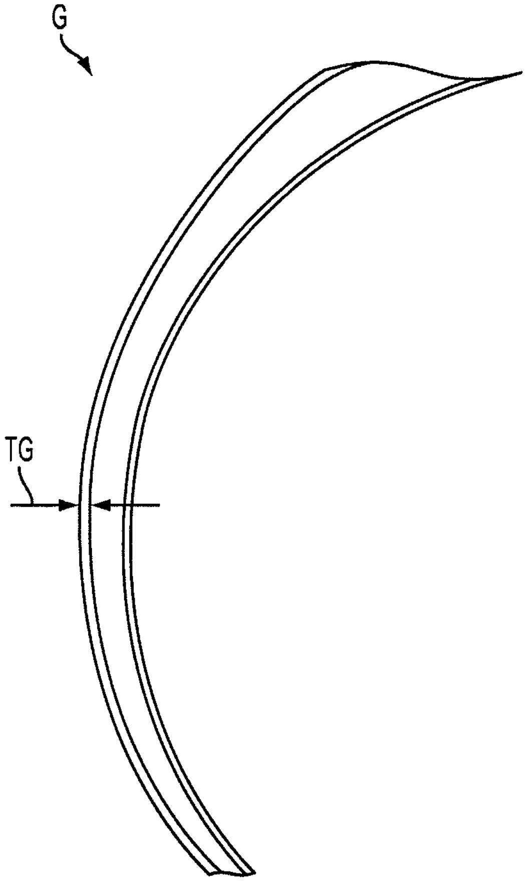
FIG. 28 PRIOR ART
FIG. 28 is a top view of the clutch cover of the prior art screw shaft and clutch body assembly of FIG. 1.

FIG. 28 is a top view of a portion of the prior art clutch cover G of FIG. 1. The clutch cover G is crimped on to the clutch body H and serves as a cover to keep oil and grease from contaminating the head and body discs M1, N1. The clutch cover G can have a thickness TG of, for example, approximately 0.036 inches.

Figure 27:
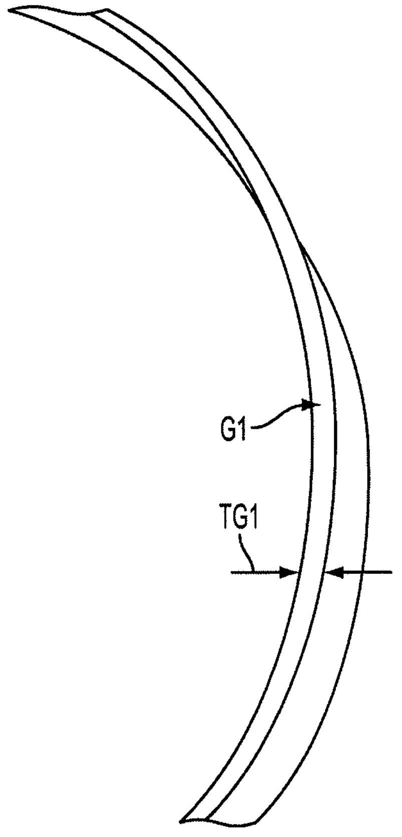
FIG. 27 is a top view of an embodiment of a clutch cover of the screw shaft integrated with the clutch body apparatus of FIG. 2.

FIG. 27 is a top view of a portion of the clutch cover G1 of FIG. 2. The clutch cover G1 may serve as a protective cover. The clutch cover G1 may be made from heavier gauge tubing than the prior art. For example, it may have a thickness TG1 of, for example, approximately 0.074 inches. The clutch cover G1 may be pressed over the clutch body D1 to provide additional strength to the fingers 2006 of the clutch body H1 to contain the radial forces that the clutch body H1 exerts against the fingers 2006. The clutch cover G1 can have an increased length to cover the expanded head and body disc area of the present invention.

The drive 2000 according to the present invention can transmit higher torque than the prior art assembly 1000. To set the clutch torque in the desired range, a lapping compound, comprising, for example, graphite and a light grade oil, can be spread between each disc in the head and body disc stack M1, N1. After the clutch is assembled, the complete clutch assembly can be driven at various speeds, and against measured resistances, for a prescribed time period. The adjusting nut S1 can be periodically tightened during this process, thus increasing the resistance. This process “laps in” the discs M1, N1, and because the resistance is measured during the process, the slipping point of the clutch can be set to the desired torque level.

The drive 1000 of the prior art typically uses head M and body N discs that are stamped by a die. The stamping process often leaves edges of the discs that are turned, i.e., not flat. Since the friction clutch needs as much disc-face-to-disc-face contact as possible between the dissimilar metals of the head and body discs M, N, the edges and any rough and/or uneven surfaces between the discs M, N are removed. In contrast, with the present invention, the head and body discs M1, N1 can be water-jetted rather than stamped. The water-jetting reduces the edge on the discs M1, N1, and may reduce the amount of "lapping" necessary to make the disc faces mate.

Using the proper technique for the lapping of the head and body discs M1, N1 and setting the torque slip point helps the drive 2000 of the present invention consistently transmit torque in the range of approximately 390-415 ft/lb.

It will be understood that the above description of the present invention is susceptible to various modifications, changes and adaptations, and the same are intended to be comprehended within the meaning and range of equivalents of the appended claims.

What is claimed is:

1. A drive for coupling an engine starter to an engine, the drive comprising:

a drive portion including a screw shaft; and a clutch portion including:

a clutch body integrated with the screw shaft, wherein the screw shaft defines a fillet at a junction of the clutch body and screw shaft;

a clutch head including a cylindrical portion defining an inside wall, the inside wall including a spline system adapted to couple the clutch head with a shaft of the engine starter, the spline system includes a plurality of inner rib splines running longitudinally along the inside wall;

at least one head disc;

at least one body disc;

a plate including a plurality of pins;

a plurality of pressure springs adapted to couple with the plurality of pins;

an adjusting plate; and an adjusting nut comprising a threaded split nut and a lock screw.

2. The drive of claim 1, further comprising:

a stop nut located on the screw shaft;

a pinion located on the screw shaft;

a pinion washer located on the screw shaft; and a drift spring located on the screw shaft.

3. The drive of claim 1, wherein the clutch body comprises a plurality of fingers located at a distal end of the clutch body, and each of the fingers defines a length of at least approximately 1.2 inches and a thickness of at least approximately 0.15 inches.

4. The drive of claim 1, further comprising a clutch cover to surround the clutch body, wherein the clutch cover defines a wall thickness of approximately 0.74 inches.

5. The drive of claim 1, wherein the apparatus transmits approximately 380 to 420 ft/lb of torque from the engine starter to the engine.

6. The drive of claim 1, wherein the at least one head disc comprises at least 13 head discs.

7. The drive of claim 1, wherein the at least one body disc comprises at least 14 body discs.

8. The drive of claim 1, wherein the at least one body disc defines a thickness of at least about 0.035 inches and includes an ear having a longitudinal length of at least about 0.12 inches.

9. The drive of claim 1, wherein each inner rib spline defines a length of at least about 1.7 inches and a spline depth of at least approximately 0.05 inches.

10. The drive of claim 1, wherein the clutch head defines a length of at least about 3 inches.

11. The drive of claim 10, further comprising a backing washer defining a thickness of at least about 0.14 inches.

12. The drive of claim 1, wherein the clutch head comprises a cylindrical portion defining an outside wall, the outside wall defining a plurality of ears located at a distal end of the clutch head, and a plurality of outer rib splines running longitudinally along the outside wall and ending at the ears.

13. The apparatus according to claim 12, wherein the ears define a thickness of at least about 0.09 inches.

14. The apparatus according to claim 12, wherein the outer rib splines define a length of at least approximately 1.2 inches, and the outside wall defines a thickness of at least approximately 0.25 inches at its narrowest point.

15. The apparatus according to claim 1, wherein the plurality of pins of the plate comprises at least 11 pins, the drive further comprising a pressure spring located on each pin.

* * * * *